United States Patent [19]

Brorein

[11] 4,318,461
[45] Mar. 9, 1982

[54] SAFETY GROUNDING FOR METAL CLAD CABLES

[75] Inventor: William J. Brorein, Whippany, N.J.

[73] Assignee: GK Technologies, Incorporated, Greenwich, Conn.

[21] Appl. No.: 145,013

[22] Filed: Apr. 29, 1980

[51] Int. Cl.³ .......................................... H02G 11/00
[52] U.S. Cl. ............................................. 191/12.2 R
[58] Field of Search ................. 191/12.2 R, 12.2 A, 191/12.4

[56] References Cited

U.S. PATENT DOCUMENTS

| | | | |
|---|---|---|---|
| 1,689,098 | 10/1928 | Wyman | 191/12.2 R |
| 2,486,167 | 10/1949 | Jurasevich | 191/12.2 R |
| 3,715,526 | 2/1973 | Blanch | 191/12.2 R |
| 4,141,438 | 2/1979 | Diem | 191/12.2 R X |

Primary Examiner—Richard A. Schacher
Attorney, Agent, or Firm—Hopgood, Calimafde, Kalil, Blaustein & Judlowe

[57] ABSTRACT

When metal clad cables are being installed, it is important that they be grounded to protect personnel in the event the cables comes in contact with an exposed electrical circuit in the building spaces. This invention provides a means for grounding the cable, and the grounding means are part of a spool assembly on which the cable is wound at the time that it is sold. The connection for grounding a cable is reliable and convenient, and the fact that it is part of the spool on which the cable is originally supplied to the user, makes it possible to keep the cost lower than presently used grounding apparatus of the prior art.

12 Claims, 6 Drawing Figures

SAFETY GROUNDING FOR METAL CLAD CABLES

BACKGROUND AND SUMMARY OF THE INVENTION

For convenience, the grounding connection of this invention should be made through an inexpensive, factory-applied device which becomes part of the cable reel thereby eliminating the high labor cost and time for applying such devices in the field. Such devices must permit the reel to be rotated, while the cable is being pulled off during installation, on either a shaft and jack stand or a shaftless floor roller pay-off apparatus.

The invention consists of an assembly of two separate parts which may be stamped or otherwise formed, and preferably made as interlocking metal plates with ball bearings in a race between the plates. The race is located concentrically with respect to a center hole of the cable reel, the two plates being free to rotate independently of each other in a plane perpendicular to the center hole of the reel. One plate is fastened to the side of the reel with the center hole of the plate aligned concentrically around the reel arbor hole, and this plate is electrically connected to the inside end of the metal clad cable on the reel. The outer plate is connected to a grounding cable, and this outer plate preferably makes electrical connection to the inner plate through ball bearings located between the plates, and which are used to permit relative movement of the plates with minimum friction, and through the interlocked edges of the plates and leaf springs between them in the preferred embodiment of the invention.

The reel and inner plate are free to rotate while the stationary outer plate is connected to the ground. This ground connection device permits the reel to be mounted on a shaft through its center arbor hole where a shaft and jack stand pay-off arrangement is used, or the reel may be mounted on floor rollers where this type of pay-off is desired.

This invention is quickly and easily installed at the cable factory to reels of cable by means of sheet metal screws. One screw is run through the inner plate and the cable end to make the electrical and mechanical connection between the plate and cable, and additional screws are used to fasten the inner plate to the reel flange.

Ground wire connection to the outer plate may be made as shown in the drawings. For greater convenience, a quick connect means is desirable to save time in the field, and this is accomplished by factory welding a steel tube to the outer plate, and in the field, simply inserting a snug fitting metal rod which is attached to the grounding wire. This allows the grounding wire to be quickly attached and removed when the reel must be moved to different locations for installation of the cable. The rod may be held in the tube by a set screw or by resilient indents formed in the wall of the tube.

Other options, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
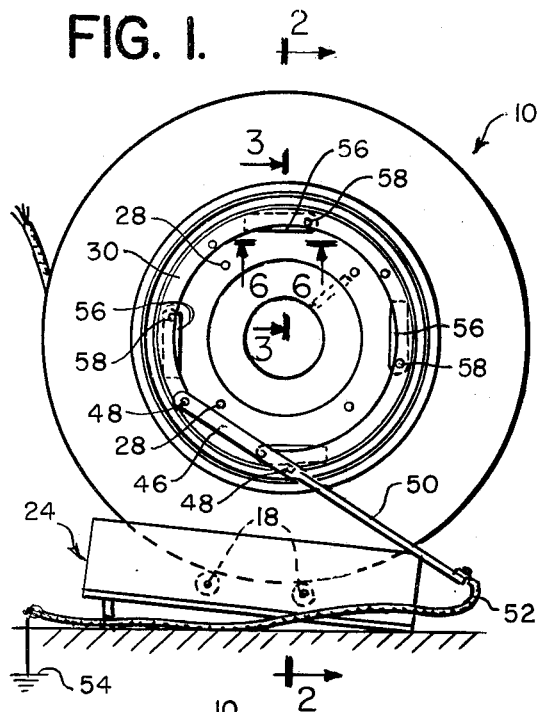
FIG. 1 is a side elevation of a cable reel rotatably supported on floor rollers and equipped with the grounding apparatus of this invention.

A reel 10 has a drum 12 (FIG. 12) and flanges 14 at opposite ends of the drum 12. There is an arbor opening 16 in each of the flanges 14 for receiving a shaft 18 (FIG. 5) when the reel is to be supported by a shaft and conventional jack stand pay-off structure; but in FIG. 2 the reel is supported on a pay-off that has rollers 18 that rotate on axles which extend through vertical flanges 20 and 22 at opposite sides of the floor roller pay-off mechanism indicated generally by the reference character 24 in FIGS. 1 and 2.

Figure 3:
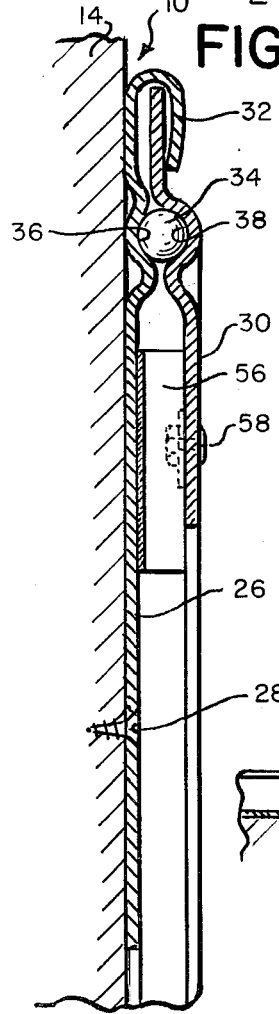
FIG. 3 is a greatly enlarged sectional view taken on the line 3—3 of FIG. 1.

FIG. 3 is an enlarged sectional view showing interlocked metal plates including an inner plate 26 rigidly secured to the flange 14 on one side of the reel 10, preferably by screws 28. An outer plate 30 is interlocked with the inner plate 26 by a bent over circumferential portion 32 of the inner plate. This bent over portion 32 holds the plates 26 and 30 together; and there are ball bearings 34 which are held in place by races 36 and 38 formed in confronting faces of the inner plate 26 and the outer plate 30, respectively.

The circumferences of the plates 26 and 30, and the ball races 36 and 38 are coaxial with the center axis of the drum 12.

Figure 2:
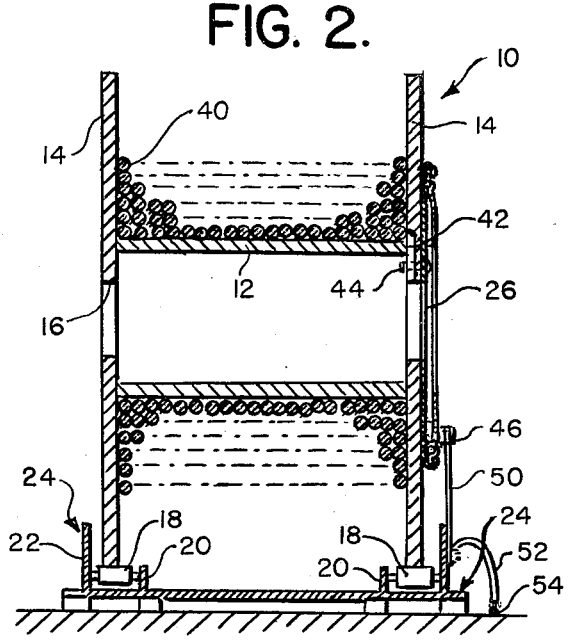
FIG. 2 is a sectional view taken on the line 2—2 of FIG. 1.

Referring to FIG. 2, there is metal clad cable 40 wound on the drum 12 with an inner end 42 of the cable connected in the circuit of the inner plate 26 by a screw or bolt 44. This puts the inner plate 26 in the circuit with the metal cladding on the outside of the cable 40.

A grounding circuit from the inner plate 26 leads through the ball bearings 34, leaf springs 56 and flange 32 and through outer plate 30 to a conductor 46 which is rigidly attached to the outer plate 30 by welding or other fastening means such as screws; and there is a grounding connection 50 which extends into a hollow interior of the conductor 46. A ground wire 52 is shown in FIGS. 1 and 2 leading from the grounding connection 50 to a convenient ground connection at a location 54.

Figure 6:
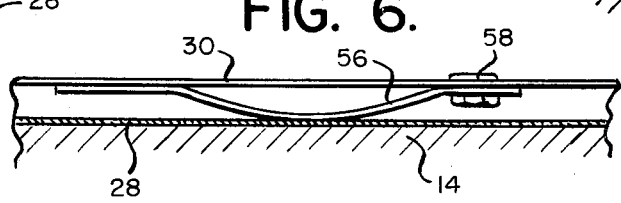
FIG. 6 is a section on the line 6—6 of FIG. 1.

Leaf springs 56 are connected to the outer plate 30 by fastenings 58 and mid-portions of these leaf springs 56 bear against the outwardly facing surface of the inner plate 26, as is best shown in FIGS. 3 and 6. FIG. 1 shows four such leaf springs 56 but more or fewer springs can be used. The leaf springs 56 provide additional conductors for electricity from the inner plate to the outer plate along with the sliding connection between flange 32 and the outer plate 30. These multiple parallel electrical paths are essential to carry the large current surge resulting from an accidental contact between the cable and an electrical circuit.

Figure 4:
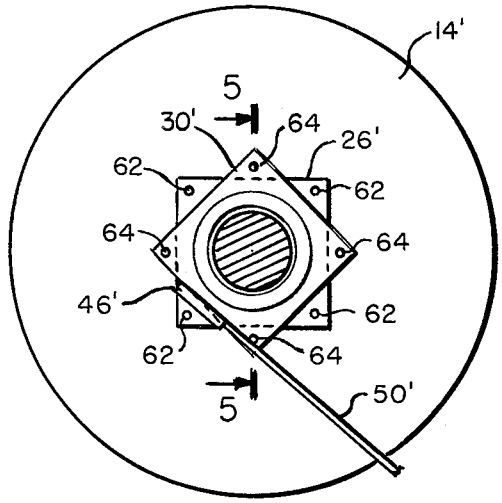
FIG. 4 is a view showing a side elevation of the reel, as in FIG. 1, but equipped with a modified grounding connection of the invention.
Figure 5:
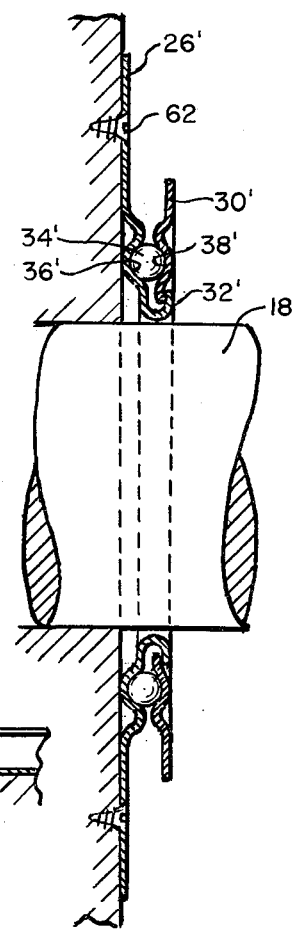
FIG. 5 is a greatly enlarged sectional view taken on the line 5—5 of FIG. 4.

FIGS. 4 and 5 show a modified construction of the invention having an inner plate 26' and an outer plate 30' which are interlocked with one another by a rolled over portion 32'. Ball bearings 34' run in races 36' and 38'.

The inner plate of 26' is secured to the flange 14' by screws 62. There are four such screws 62 shown in FIG. 4 and the inner plate 26' is shown as a square plate in FIG. 4. The outer plate 30' is also shown in FIG. 4 as being square and with openings 64 adjacent its corners to facilitate some uniformity in the manufacture of the plates 26' and 30'.

A conductor tube 46' is welded, or otherwise secured to the outer plate 30' and a grounding connection 50' consists of a metal rod which is inserted into the conductor tube 46' with a tight fit. The openings 64 in the outer plate 30' can be used for receiving fastenings to connect a longer conductor tube 46' to the outer plate 30', if desired.

The construction shown in FIGS. 4 and 5 is more economical to manufacture because the plates 26' and 30' can be smaller since they do not have to be circular at their outer edges in order to accomodate the bent over portion 32 of FIG. 3. By having the bent over portion 32' of FIG. 5 produce the interlocking of the inner plate 26' and the outer plate 30', the ball races 34' and 38' have shorter circumferences and the number of balls required for each device is reduced. The construction of FIGS. 4 and 5 obtains the same relative movement as in FIGS. 1–3 in that the inner plate 26' rotates as a unit with the drum 14' and the outer plate 30' remains stationary while the cable is unwound from the drum 14'. The grounding connection 50' can be grounded at any convenient location as in FIG. 1.

It will be seen that the described grounding construction is so relatively inexpensive that it may be deemed to be expendable, i.e., it need not be reclaimed from an exhausted reel for application to a new reel. Thus, a reel equipped with the described grounding device may be factory-loaded by clamping the inner or starting end of the cladding at 44 and then winding the reel with a full load of cable. On arrival at the site of use, a quick electrical ground is made to the outer plate 30, whereby grounded protection is available regardless of accidental voltage exposure of the cladding in the course of cable payout.

The preferred embodiment and one modification of the construction have been illustrated and described, but various changes and modifications can be made and some features of the invention can be used in different combinations without departing from the invention as defined in the claims.

What is claimed is:

1. A cable reel for metal clad cable including a drum on which the metal clad cable is wound, and flanges for holding the metal clad cable on the drum of the reel, characterized by a grounding structure connected with the metal cladding of the inner end of the cable on the drum, a first annular electrically conductive metal element having a surface constituting part of the grounding structure and concentric with the drum for rotation as a unit with the cable reel, the grounding structure including also a second annular electrically conductive metal element connected with the first element as part of an assembly that connects with and is carried by said reel, said first and second elements having relative movement with respect to one another, said second element being held in slidable electrical and mechanical contact with the first element by an annular grooved flange on said first element which overlaps a surface of the second element, a ground connection secured to the second element, said first and second elements having faces that confront one another with anti-friction bearings held between said elements in annular races and on which the elements have their relative movement with respect to one another, the anti-friction bearings constituting conductors of electricity from the first element to the second element.

2. The combination described in claim 1 characterized by each of said first and second elements having ball races of equal radius confronting one another, and overlapping interlocked sliding surfaces on said first and second elements for holding the confronting ball races spaced from one another by a distance that keeps the balls in the races.

3. The combination described in claim 1 characterized by a fixed structure connected with the second element and holding the second element against rotation as cable is unwound from the drum, including a ground connection secured to the second element.

4. The combination described in claim 1 characterized by the first and second elements having an outer peripheral edges that are of different diameter, and the edge of greater diameter being bent to form a slidable flange around the edge of less diameter so as to hold the elements against axial displacement from one another but permit each element to rotate independently of each other.

5. The combination described in claim 1 characterized by the first and second elements having inner peripheral edges that are of different diameter, and the edge of lesser diameter being bent to form a slidable flange around the edge of greater diameter so as to hold the elements against axial displacement from one another but permit the elements to rotate independently of each other.

6. The combination described in claim 1 characterized by one of said elements having an annular groove and the other element having an edge that extends into the groove with said groove and edge facing in directions to hold the elements in confronting relation with one another and relatively movable about the axis of rotation of the drum.

7. The combination described in claim 1 characterized by the ground connection of the second element holding the second element against rotation while the cable is unwound from the reel.

8. The combination described in claim 1 characterized by the first and second elements being of generally equal area and having outer peripheries that are polygonal in shape so that vertices of one polygon extend beyond sides of the other polygon during relative rotation of the first element with respect to the second element, and the first element having openings therein for receiving fastenings that secure the first element to the outside surface of the reel, the openings being at a distance from the axis of rotation of the first and second elements, with respect to one another greater than the distance of the center of the mid-point of a side of the second element, the openings being located adjacent to lines which extend from the center of rotation of the elements to vertices of the second element.

9. A cable reel for metal clad cable including a drum on which the metal clad cable is wound, and flanges for holding the metal clad cable on the drum of the reel, characterized by a grounding structure connected with the metal cladding of the inner end of the cable on the drum, a first annular metal element having a surface constituting part of the grounding structure and concentric with the drum for rotation as a unit with the cable reel, the grounding structure including also a second annular metal element connected with the first element as part of an assembly that connects with and is carried by said reel, said first and second elements having relative movement with respect to one another, and having multiple parallel contacts which form a low resistance electrical circuit between said first and second elements, said second element being held in slidable electrical and mechanical contact with the first element by an annular grooved flange on said first element which overlaps a surface of the second element, said first element having an inner surface that contacts with the outside surface of a flat flange of the reel over a substantial part of the confronting faces of said inner surface and the flange, a formed outer surface of the first element that extends away from the flange, said formed outer surface having a reverse curvature that forms a recess defining a ball race on the side of the first element that faces away from the flange of the reel, the recess being shaped so that the outside of the ball race extends no further toward the flange of the reel than said outside surface of the flange of the reel.

10. As an article of manufacture, a cable reel and a length of metal-clad cable wound on said reel and extending from an inner reel-clamped end to a pay-out end, said reel comprising a central cylindrical drum with outward circumferential end flanges, a ball-bearing assembly of formed metal plates with confronting raceway formations extending circumferentially about the axis of the bearing assembly, metal balls in said raceway formations, means securing one of said plates to one of said flanges and including conductive means providing a clamped connection to the metal-clad portion of the inner end of said cable, whereby the inner end of the metal cladding of said cable is electrically conformed to that of said plates, and ground-connecting means on the other of said plates, whereby upon establishing electrical-ground connection to said ground-connecting means, the cladding of said cable remains electrically grounded at all times in the course of pay out.

11. The article of claim 10, in which said ball-bearing assembly is of the thrust-bearing variety wherein said plates define axial ends of the bearing, said plates having engaged peripheral formations to retain axial assembly while permitting their relative rotation.

12. As an article of manufacture, a cable reel and a length of metal-clad cable wound on said reel and extending from an inner reel-clamped end to a pay-out end, said reel comprising a central cylindrical drum with outward circumferential end flanges, an assembly of confronting axially inner and outer metal plates in retained relatively rotatable and electrically interconnected relation, means securing the inner plate to the outer surface of one of said flanges with the axis of relative rotation on the drum axis, said securing means including a conductive element providing a clamped connection to the metal-clad portion of the inner end of said cable, whereby the inner end of the metal cladding of said cable is electrically conformed to that of said plates, and ground-connecting means on the outer plate, whereby upon establishing electrical-ground connection to said ground-connecting means, the cladding of said cable remains electrically grounded at all times in the course of pay out.

* * * * *